(12) United States Patent
Nyssen et al.

(10) Patent No.: US 6,903,065 B2
(45) Date of Patent: Jun. 7, 2005

(54) PARTICULATE SOLIDS OF SURFACE-ACTIVE COMPOUNDS

(75) Inventors: Peter-Roger Nyssen, Dormagen (DE); Dietmar Fuchs, Pulheim (DE); Hans-Peter Müller, Oberkotzau (DE)

(73) Assignee: Bayer Aktiengesellschaft, Leverkusen (DE)

( * ) Notice: Subject to any disclaimer, the term of this patent is extended or adjusted under 35 U.S.C. 154(b) by 51 days.

(21) Appl. No.: 10/147,637

(22) Filed: May 17, 2002

(65) Prior Publication Data

US 2002/0177533 A1 Nov. 28, 2002

(30) Foreign Application Priority Data

May 22, 2001 (DE) .......................... 101 24 902

(51) Int. Cl.[7] .......................... C11D 1/00; C11D 11/00; C11D 17/06
(52) U.S. Cl. .................. 510/446; 510/438; 510/445; 510/475; 510/535
(58) Field of Search ................. 510/438, 445, 510/446, 475, 535

(56) References Cited

U.S. PATENT DOCUMENTS

| | | | |
|---|---|---|---|
| 4,178,393 A | 12/1979 | Gregersen | 426/653 |
| 4,483,880 A | 11/1984 | Koizumi et al. | 426/549 |
| 6,077,339 A | 6/2000 | Nyssen et al. | 106/31.77 |
| 6,080,714 A * | 6/2000 | Overkempe et al. | 510/433 |
| 2002/0177533 A1 * | 11/2002 | Nyssen et al. | 510/108 |

FOREIGN PATENT DOCUMENTS

| | | | |
|---|---|---|---|
| DE | 41 32 693 | 4/1993 | |
| DE | 197 45 964 | 6/1998 | |
| DE | 10124902 | * 11/2002 | ........ C11D/17/06 |
| EP | 0 945 173 | 3/1999 | |
| EP | 0 945 173 | 9/1999 | |
| EP | 0 764 695 | 12/2001 | |

* cited by examiner

Primary Examiner—Brian P. Mruk
(74) Attorney, Agent, or Firm—Diderico Van Eyl

(57) ABSTRACT

The invention relates to particulate solids comprising more than 90% by weight of natural or synthetic surface-active compounds for which a) the mean particle size of the particulate solid particles is 10 to 3000 µm, b) the surface-active compounds are solid at room temperature, and c) the surface-active compounds have a melting point of from 25 to 250° C.

12 Claims, 1 Drawing Sheet

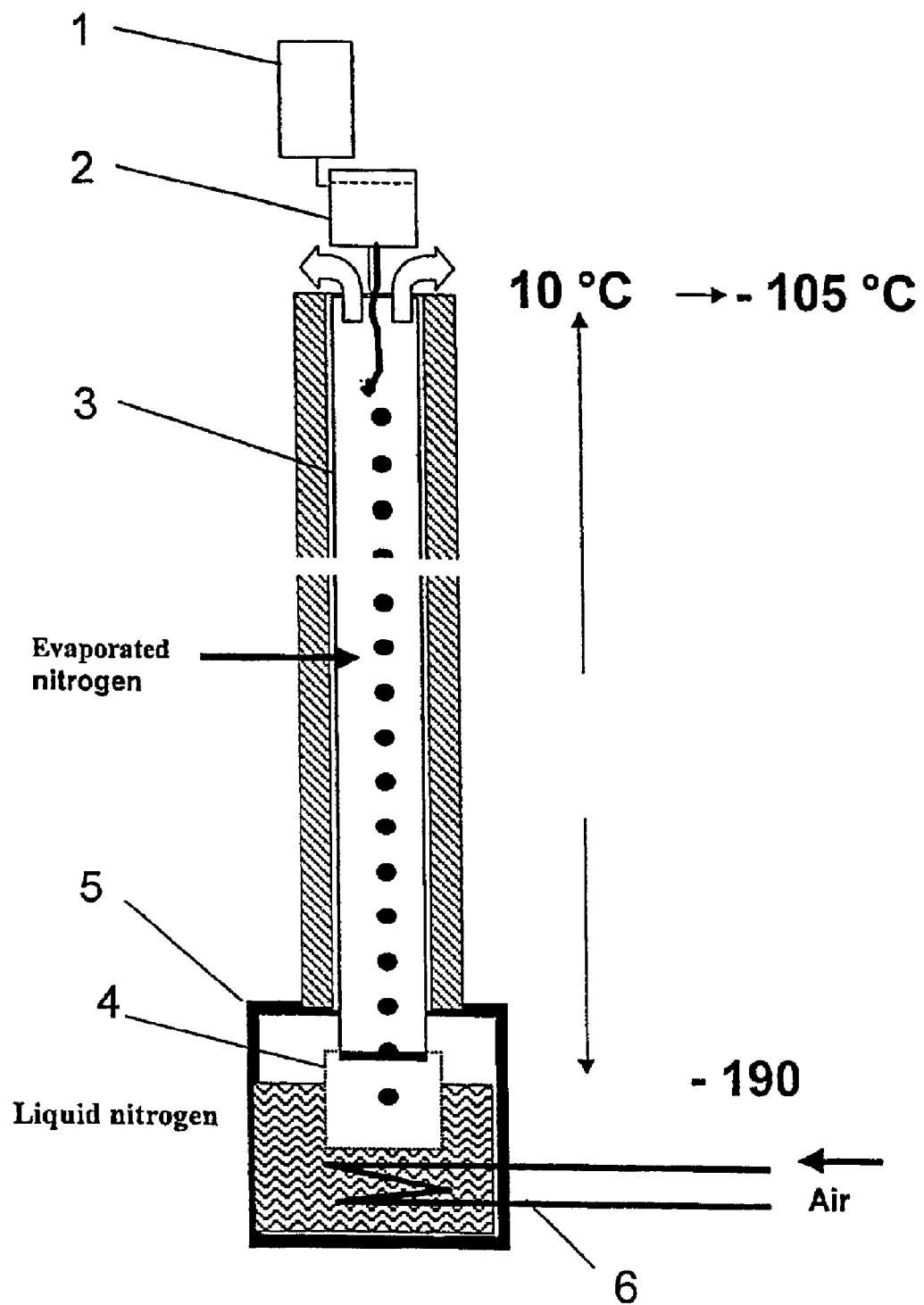

PARTICULATE SOLIDS OF SURFACE-ACTIVE COMPOUNDS

BACKGROUND OF THE INVENTION

The invention relates to particulate solids of surface-active compounds and to a process for their production.

Due to their chemical structure, many surface-active compounds are produced in the form of substances that are solid, usually solid in a wax-like manner, at room temperature.

In this form, the compounds cannot be used or handled efficiently and economically, for example, as emulsifiers for aqueous systems, and, in particular, are difficult to meter or require long dissolution times. For this reason, either optionally stabilized solutions (generally aqueous) of low concentration are used or the solid substances in the form of flakes or pellets are used. Disadvantages of aqueous solutions are frequently the low concentration, the presence of adjustment or stabilization auxiliaries, such as pH regulators and preservatives, and in some cases the water itself.

Disadvantages of flakes or pellets are the dissolution rate, which is still poor, and also the usually uneconomical production. Subsequent grinding, such as, for example, cryogrinding, to give a powder is frequently necessary as an additional complex working step.

Efforts are therefore being made to obtain readily flowable particulate solids, for example, powders or granules, of surface-active compounds that can easily be metered into the use systems, for example, aqueous systems, and have the highest possible dissolution rate, such as, by way of comparison, liquid formulations or melts of the compounds.

The object of the invention is therefore a process for the economical production of particulate solids of surface-active compounds.

SUMMARY OF THE INVENTION

The present invention therefore relates to a process for the economical production of particulate solids of surface-active compounds comprising
(1) introducing the compounds in liquid form at a temperature above their melting point into a chamber charged with cryogas with droplet formation,
(2) cooling the compounds to the solid state, and
(3) separating the compounds from the cryogas as particulate solids, wherein the separation from the gaseous cryogas can preferably take place inside or outside the chamber.

BRIEF DESCRIPTION OF THE DRAWING

The FIGURE illustrates the use of an apparatus in one embodiment of the present invention.

DETAILED DESCRIPTION OF THE INVENTION

Processes for the production of powders from melts with the aid of spraying into low-boiling gases are disclosed, for example, in DE 4132693 for metal melts. EP 945,173 A1 describes a similar process for plastics, waxes, pharmaceutical products or foods.

Such substances, particularly waxes are generally synthetic or natural compounds that are not soluble in water and in particular do not have surface-active properties and are inert towards cryogases. Such substances are usually distinguished, in particular, by very high surface tension against an inert gas phase, particularly by not having a surfactant-like character that reduces the surface tension in water.

Surprisingly, it has now been found that even meltable surface-active substances (in the narrower sense in particular of surfactants having a surface tension in aqueous solution of less than 40 mN/m) that are solid at room temperature can be converted, particularly economically, into particulate solids by cryogas spraying. Surprisingly, it has been found, in particular, that droplet formation is achieved and aggregation in the gas space or in the cryogas during cooling is avoided to the extent that a free-flowing powder or granular material is obtained.

The preferred process and a preferred apparatus are described in principle in EP 945,173 A1.

The preferred process is particularly characterized by arranging an atomization or droplet formation unit, to which the surface-active compound is fed in the form of its liquid melt (optionally under superatmospheric pressure), in the upper part of a solidification chamber or on a solidification tube. The melt typically leaves the droplet formation unit either in the form of discrete droplets (for example, by use of a droplet generator) or in the form of jets or fine filaments that break up to form droplets with increasing separation from the droplet formation unit due to laminar or turbulent jet break-up and preferably fall downwards due to gravity. The cryogas, generally $N_2$ or $CO_2$, is introduced into the chamber in the predominantly liquid state beneath the droplet formation unit using a supply device and is brought into contact with the melt jets or droplets, with a temperature gradient of the cryogas forming in the chamber between the droplet formation unit and entry of the cryogas. The temperature gradient is preferably set up in such a way that jet break-up (droplet formation) is not hindered by solidification in the region beneath the droplet formation unit ("1st zone"), that a cooler zone ("2nd zone"), in which the droplets or melt particles solidify on the surface so that they no longer stick, follows the droplet formation zone, and that an even colder zone ("3rd zone"), in which the droplets or particles solidify completely, even in their interior, follows the 2nd zone. The particulate solids obtained in this way can then be removed from the lower region of the chamber, for example, using a pneumatic discharge device, together with the cryogas and subsequently separated by using, for example, filtration or cyclone separators and collected. The amount of cryogas necessary depends first on the amount of particulate solid to be produced, the particle size, and the specific heat capacity of the melt. The temperature distribution described is monitored by means of temperature sensors in/on the zones of the chamber. The amount of cryogas is regulated either in accordance with the desired temperature distribution in the chamber or, particularly, in accordance with the off-gas temperature of the cryogas behind the chamber or the separator (in the case of steady-state operation).

In accordance with the invention, the droplet formation unit can have any desired design using, for example, disc atomizers or nozzles, preferably high-pressure nozzles or whirl chamber nozzles. It is possible to use one or more nozzles. After the jet break-up, the droplets produced are initially non-spherical but preferably adopt a spherical shape thereafter. Depending on the type and setting of the droplet formation unit, droplets or, after their solidification, particulate solids having mean diameters (volume related) of from 10 to 3000 $\mu$m (particularly from 20 to 1000 $\mu$m) can be produced. For the purposes of the invention, the terms powder and granular material cannot be sharply differentiated, since, as a consequence of the process, both particle shapes and mixed forms may occur. For this reason, unless otherwise stated, the term particulate solids is used herein. In the region of higher diameters above 100 μm, the term granular materials can be used for both individual particles (analogous to spray drying) and agglomerates. For low-dust products in particular, the granule shape in the form of slight sticking of very fine particles to one another or to larger ones is not excluded or is even desired.

In a preferred embodiment, the particulate solid comprises more than 90% by weight (particularly more than 98% by weight) of the surface-active compound.

The preferred design of the chamber is rotationally symmetrical. The cryogas is preferably introduced, preferably via a nozzle, from a plurality of individual feed points arranged at the periphery of the chamber.

In a particular embodiment of the process, targeted agglomeration of particles to give a granular material takes place during or after the solidification of the droplets, for example, through use of fluidized-bed agglomeration, which is either integrated into the lower part of the chamber or is installed downstream of the chamber. Preference is given to fluidized-bed agglomeration integrated into the chamber, where at least some of the cryogas can be utilized to generate the fluidized bed, and the agglomeration takes place through attachment of fine or extremely fine individual particles onto larger, still incompletely solidified particles (so-called "raspberry granules"). This process gives particularly low-dust granules. The typical mean granule particle sizes are 50 to 3000 μm, particularly larger than 100 μm.

The term surface-active compounds is preferably taken to mean emulsifiers, wetting agents, dispersants, antifoams, or solubilizers that are solid at room temperature and are completely soluble in the aqueous phase. In particular, surface-active compounds can be non-ionogenic, anionogenic, cationogenic, or amphoteric and can be of a monomeric, oligomeric or polymeric nature. The choice of surface-active compounds is not restricted in accordance with the invention. Suitable in the broader sense are water-soluble surfactants such as, for example, emulsifiers, wetting agents, dispersants, or antifoams, furthermore also optionally water-insoluble compounds, particularly from the group consisting of sorbitan esters, such as, for example, SPAN® (ICI), polymers, particularly block and block copolymers based on ethylene oxide and/or propylene oxide, such as, for example, Pluronic® (BASF), block and block copolymers of ethylene oxide and/or propylene oxide on bifunctional amines, such as, for example, Tetronic® (BASF), block copolymers based on (poly)stearic acid and (poly)alkylene oxide, such as, for example, Hypermer® B (ICI), and polyvinylpyrrolidone and copolymers having a molecular weight of >100,000 g/mol, such as, for example, Luviskol K®, BASF Preferred water-soluble surface-active compounds that may be mentioned are those from a) to d):

a) non-ionic or ionically modified compounds selected from the group consisting of alkoxylates, alkylolamides, esters, amine oxides, and alkylpolyglycosides, particularly products of the reaction of alkylene oxides with alkylatable compounds, such as, for example, fatty alcohols, fatty amines, fatty acids, phenols, alkylphenols, carboxamides, and resin acids. These compounds are, for example, ethylene oxide adducts from the class consisting of the products of the reaction of ethylene oxide with:

m) saturated and/or unsaturated fatty alcohols having from 6 to 25 carbon atoms or n) alkylphenols having from 4 to 12 carbon atoms in the alkyl radical or o) saturated and/or unsaturated fatty amines having from 14 to 20 carbon atoms or p) saturated and/or unsaturated fatty acids having from 14 to 22 carbon atoms or q) hydrogenated and/or unhydrogenated resin acids, r) esterification and/or arylation products that have been prepared from natural or modified, optionally hydrogenated castor oil fatty bodies and that are optionally linked to dicarboxylic acids by esterification to give recurring structural units, b) ionic or non-ionic compounds selected from the group consisting of the products of the reaction of alkylene oxide with sorbitan esters [Tween® (ICI)], alkoxylated acetylenediols and acetylene glycols, alkoxylated phenols, particularly phenol/styrene polyglycol ethers of the formula (I) and (II) and ionically modified phenol/styrene polyglycol ethers of the formula (I) or (II), such as disclosed, for example, in EP-A 839,879 [or EP-A 764,695]. The term "ionic modification" is taken to mean, for example, sulfation, carboxylation, or phosphation.

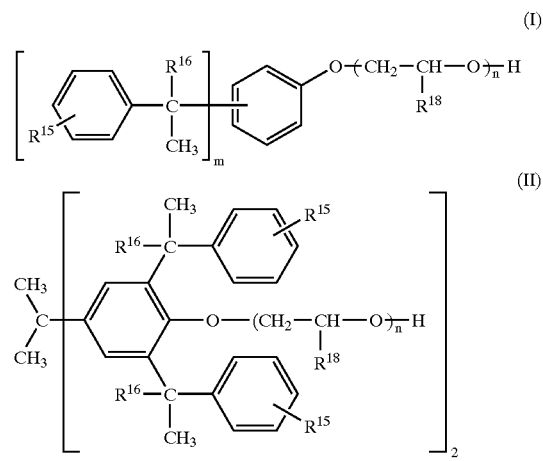

in which $R^{15}$ is hydrogen or $C_1$–$C_4$-alkyl, $R^{16}$ is hydrogen or $CH_3$, m is a number from 1 to 4, n is a number from 14 to 120 (particularly 20 to 100), $R^{18}$ is identical or different for each unit having the index n and is hydrogen, $CH_3$, or phenyl, with the proviso that if $CH_3$ is present in the various —(—$CH_2$—$CH(R^{18})$—O—)— groups, then $R^{18}$ is $CH_3$ in from 0 to 60% of the total value of n and is hydrogen in from 100 to 40% of the total value of n, and with the proviso that if phenyl is present in the various —(—$CH_2$—$CH(R^{18})$—O—)— groups, then $R^{18}$ is phenyl in from 0 to 40% of the total value of n and is hydrogen in from 100 to 60% of the total value of n.

Ionically modified compounds can either be in the form of their free acids or preferably in the form of a salt, particularly in the form of an alkali metal or amine salt, preferably in the form of the diethylamine salt.

c) ionic or non-ionic polymeric surface-active agents from the group consisting of homo- and copolymers, graft and graft copolymers, and random and linear block copolymers. Examples of suitable polymeric surface-active agents are polyethylene oxides, polypropylene oxides, polyoxymethylenes, polytrimethylene oxides, polyvinyl methyl ethers, polyethyleneimines, polyacrylic acids, polyarylamides, polymethacrylics acids, polymethacrylamides, poly-N, N-dimethylacrylamides, poly-N-iso-propylacrylamides, poly-N-acrylglycinamides, poly-N-methacrylglycinamides, polyvinyloxazolidones, and polyvinylmethyloxazolidones.

d) anionic non-polymeric surface-active agents, particularly those selected from the group consisting of alkyl sulfates, ether sulfates, ether carboxylates, phosphate esters, sulfosuccinate amides, (paraffin sulfonates), olefin sulfonates, sarcosinates, isothionates, and taurates, particularly alkyl sulfonates of the general formula

where R is alkyl, cycloalkyl, or alkenyl, particularly the radical of a paraffin.

The surface-active compounds have a melting point of 25 to 250° C., preferably 30 to 130° C., and particularly 35 to 90° C. The viscosity of the melt is less than 5000 mPas, preferably less than 1000 mPas, and particularly less than 200 mPas.

The temperature of the melt is particularly advantageously set in such a way that the ratio between the surface tension of the melt and the viscosity adopts a value of >0.005, particularly >0.01 [m/s].

The invention likewise relates to powders and/or granular materials comprising more than 90% by weight (preferably more than 98% by weight) of natural or synthetic surface-active compounds wherein a) the mean particle size of the particulate solid particles is from 10 to 3000 μm,
b) the surface-active compounds are solid at room temperature (20° C.), and
c) the surface-active compounds have a melting point of from 25 to 250° C. (preferably from 30 to 130° C., particularly from 35 to 90° C.).

In addition, further conventional additives, such as, for example, anticaking agents (for example Aerosil®), preservatives, stabilizers, fillers, water, and/or organic solvents may be present. The powders and granular materials according to the invention can be prepared by the process according to the invention. The same preferred embodiments apply.

The individual particles of which the particulate solids, such as powders and/or granular materials, are composed have any desired structure, preferably a predominantly spherical structure, particularly a spherical structure.

The invention is explained in greater detail below with reference to a performance example. The invention, which is set forth in the foregoing disclosure, is not to be limited either in spirit or scope by this example. Those skilled in the art will readily understand that known variations of the conditions and processes of the following preparative procedure can be used to prepare these compositions. Unless otherwise noted, all temperatures are degrees Celsius and all percentages are percentages by weight.

EXAMPLE

The example is based on a version of the process, the principle of which is shown in the FIGURE.

Liquid nitrogen was introduced into the tank (5) and evaporated by a controlled passing through of air (room temperature) via a heat exchangertube (6). A steady-state temperature profile was thereby established over the height of 10 m in the solidification tube (3) installed above. The temperature at the top of the solidification tube was varied between +10° C. and −105° C. and directly above the liquid nitrogen surface was the same as the boiling point (−190° C.) of the liquid nitrogen.

In each experimental run, 100 g of a room-temperature-solid wax of a surface-active compound based on an oleyl alcohol polyethylene glycol ether (Avolan® IW, Bayer AG) having a melting point of 45° C. was heated to a temperature of 75° C. in the flask (1) and fed to a frequency-generating injector nozzle (2) supported above the solidification tube (3) by means of a slight excess pressure of <0.3 bar of nitrogen. The droplet formation unit (2) had a hole with a diameter of 0.5 mm, and the droplet size achieved by superimposition of a frequency of >500 Hz was from about 0.8 to 1 mm (based on a spherical shape). The melt initially entered the solidification channel (3) in filament form and was collected in the form of discrete particles in the collection basket (4) within the tank (5).

Depending on the setting of the temperature profile over the height of the solidification channel (3), different particle shapes were achieved:

At a top temperature of −70° C., particles of irregular shape having poor flow properties were produced.

At a top temperature of from −20 to +10° C., particularly at 0° C., it was possible to obtain regular spherical particles having a mean diameter of from 0.8 to 1.0 mm and very good flow properties.

Under otherwise identical conditions, but with a nozzle having a diameter of 0.2 mm, non-tacky particles having a mean diameter of <0.4 mm that likewise had good flow properties were obtained.

What is claimed is:

1. A particulate solid comprising more than 90% by weight of a weight of a natural or synthetic surface-active compound wherein
   a) particles of the particulate solid have a mean particle size of from 10 to 3000 μm,
   b) the surface-active compound is solid at room temperature, and
   c) the surface-active compound has a melting point of from 25 to 250° C. wherein the particulate solid is prepared by a process comprising:
      (1) introducing the compound in liquid form at temperature above the melting point of the compound into a cryogas with droplet formation,
      (2) cooling the compound to the solid state, and
      (3) separating the compound from the cryogas as the particulate solid.

2. A particulate solid as claimed in claim 1 comprising more than 98% by weight of the natural or synthetic surface-active compound.

3. A particulate solid as claimed in claim 1 wherein the surface-active compound has a melting point of from 30 to 130° C.

4. A particulate solid as claimed in claim 1 wherein the surface-active compound has a melting point of from 35 to 90° C.

5. A particulate solid as claimed in claim 1 wherein the surface-active compound is selected from the group consisting of
   a) non-ionic or ionically modified compounds selected from the group consisting of alkoxylates, alkylolamides, esters, amine oxides, and alkylpolyglycosides, b) ionic or non-ionic compounds selected from the group consisting of the products of the reaction of alkylene oxide with sorbitan esters, alkoxylated acetylenediols and acetylene glycols, and alkoxylated phenols, c) ionic or non-ionic polymeric surface-active agents selected from the group consisting of homo- and copolymers, graft and graft copolymers, and random and linear block copolymers, and d) anionic non-polymeric surface-active agents.

6. A particulate solid as claimed in claim 5 wherein the non-ionic or ionically modified compound a) is a product of the reaction of alkylene oxides with alkylatable compounds selected from the group consisting of fatty alcohols, fatty amines, fatty acids, phenols, alkylphenols, carboxamides, and resin acids.

7. A particulate solid as claimed in claim 5 wherein the ionic or non-ionic compound b) is a product of the reaction of ethylene oxide with:

m) saturated and/or unsaturated fatty alcohols having from 6 to 25 carbon atoms or n) alkylphenols having from 4 to 12 carbon atoms in the alkyl radical or o) saturated and/or unsaturated fatty amines having from 14 to 20 carbon atoms or p) saturated and/or unsaturated fatty acids having from 14 to 22 carbon atoms or q) hydrogenated and/or unhydrogenated resin acids, r) esterification and/or arylation products that have been prepared from natural or modified, optionally hydrogenated castor oil fatty bodies and that are optionally linked to dicarboxylic acids by esterification to give recurring structural units.

8. A particulate solid as claimed in claim 5 wherein the non-ionic or ionically modified compound b) is a phenol/styrene polyglycol ether of the formula (I) or (II) or a ionically modified phenol/styrene polyglycol ether of the formula (I) or (II)

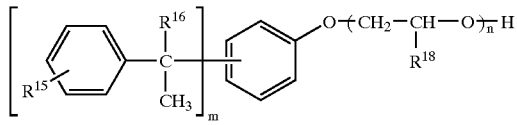
(I)

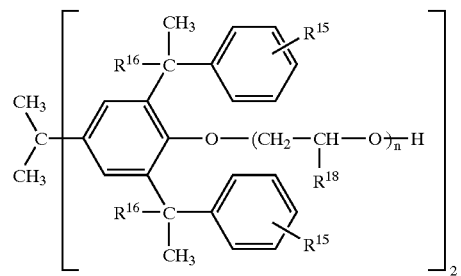
(II)

in which
$R^{15}$ is hydrogen or $C_1$–$C_4$-alkyl,
$R^{16}$ is hydrogen or $CH_3$,
m is a number from 1 to 4,
n is a number from 14 to 120,
$R^{18}$ is identical or different for each unit having the index n and is hydrogen, $CH_3$, or phenyl, with the proviso that if $CH_3$ is present in the various —($-CH_2-CH(R^{18})-O-$)— groups, then $R^{18}$ is $CH_3$ in from 0 to 60% of the total value of n and is hydrogen in from 100 to 40% of the total value of n, and with the proviso that if phenyl is present in the various —($-CH_2-CH(R^{18})-O-$)— groups, then $R^{18}$ is phenyl in from 0 to 40% of the total value of n and is hydrogen in from 100 to 60% of the total value of n.

9. A particulate solid as claimed in claim 5 wherein the anionic non-polymeric surface-active agent d) is selected from the group consisting of alkyl sulfates, ether sulfates, ether carboxylates, phosphate esters, sulfosuccinate amides, paraffin sulfonates, olefin sulfonates, sarcosinates, isothionates, and taurates.

10. A particulate solid as claimed in claim 5 wherein the anionic non-polymeric surface-active agent d) is an alkyl sulfonate of the formula

R—SO$_2$—OH where R is alkyl, cycloalkyl, or alkenyl.

11. A particulate solid as claimed in claim 1 wherein the surface-active compound is selected from the group consisting of water-insoluble compounds.

12. A particulate solid as claimed in claim 11 wherein the surface-active compound is a water-insoluble compound selected from the group consisting of sorbitan esters, block and block copolymers based on ethylene oxide and/or propylene oxide, block and block copolymers of ethylene oxide and/or propylene oxide on bifunctional amines, block copolymers based on (poly)stearic acid and (poly)alkylene oxide, and polyvinylpyrrolidone and copolymers having a molecular weight greater than 100,000 g/mol.

* * * * *